US007143366B1

(12) United States Patent
McKelvey et al.

(10) Patent No.: US 7,143,366 B1
(45) Date of Patent: Nov. 28, 2006

(54) GRAPHICAL COMPARE UTILITY

(75) Inventors: Jeffrey A. McKelvey, Brookfield, WI (US); Thomas Sielicki, Germantown, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 639 days.

(21) Appl. No.: 09/878,498

(22) Filed: Jun. 11, 2001

(51) Int. Cl.
*G06F 3/00* (2006.01)
*G06F 9/00* (2006.01)
*G06F 17/00* (2006.01)

(52) U.S. Cl. .................................. 715/965; 715/511
(58) Field of Classification Search ................ 345/751, 345/809, 840, 866, 971; 707/100, 203, 204; 715/511; 717/103, 105, 122, 125, 127, 227
See application file for complete search history.

(56) References Cited

U.S. PATENT DOCUMENTS

| 5,812,133 A * | 9/1998 | Schultz et al. ............. 345/809 |
| 6,226,652 B1 * | 5/2001 | Percival et al. ............ 707/203 |
| 6,275,223 B1 * | 8/2001 | Hughes ...................... 345/751 |
| 6,449,624 B1 * | 9/2002 | Hammack et al. ......... 707/203 |

OTHER PUBLICATIONS

Microsoft Notepad Screen Shots. pp. 1-2, figures 1-4, 1998.*
Microsoft Word Screen Shots. pp. 1-2, figures 1-4, 2000.*
SnagIt Version 5.0. Distributed by TechSmith Corporation. http://web.archive.org/web/20000339051128/www.techsmith.com/products/snagit/default.asp. Feb. 7, 2000.*

* cited by examiner

*Primary Examiner*—Kristine Kincaid
*Assistant Examiner*—Boris Pesin
(74) *Attorney, Agent, or Firm*—Amin Turocy & Calvin LLP; William R. Walbrun

(57) ABSTRACT

A system and method for displaying two different industrial control module programs in a single view is provided. The graphical compare utility provides a graphical view of a first control program in a first pane and a graphical view of a second control program in a second pane within a single frame window. The graphical compare utility can also provide indicators of insertions, deletions, moves and modifications of instructions between the first and second industrial control module programs within the graphical view. A wrapping feature can also be provided to facilitate viewing of the instructions within the viewable frame during resizing and zooming of the frame window.

21 Claims, 11 Drawing Sheets

GRAPHICAL COMPARE UTILITY

TECHNICAL FIELD

The present invention generally relates to industrial control systems and in particular to a graphical compare utility for viewing differences between control programs of industrial controllers.

BACKGROUND OF THE INVENTION

Industrial controllers are special purpose computers used for controlling factory automation devices. Under the direction of a stored program, a processor of the industrial controller examines a series of inputs reflecting the status of a controlled process or device and changes outputs affecting control of the controlled process or device. Generally industrial controllers are constructed in modular fashion to accommodate different application requiring different numbers and types of input/output (I/O) circuits as is determined by the particular device or process being controlled. The stored control program runs in real-time to provide outputs to the controlled process as electrical signals to outputs such as actuators and the like. The outputs are based on the logic of the control program and inputs received from sensors of the controlled process.

The industrial controller or programmed logic controller (PLC) executes a series of operations that are performed sequentially and repeatedly. In general, the series of operations includes an input scan, a program scan and an output scan. During the input scan the PLC examines the on or off state of the external inputs and saves these states temporarily in memory (e.g., a file). During the program scan the PLC scans the instruction of the program and uses the input status to determine if an output will be energized. The output results are then saved to memory (e.g., a file). During the output scan the controller will energize or de-energize the outputs based on the output results stored in memory to control the external devices.

A conventional language for programming the stored program is relay ladder logic. Each ladder logic program comprises one or more ladder logic statements, referred to as rungs or instructions. The ladder logic statements define relationships between an output variable and one or more input variables. Input variables are variables that correspond to signals at input terminals and output variables are variables that correspond to signals at output terminals. In relay ladder logic, the input and output signals may be represented graphically as contact symbols and coil symbols arranged in a series of rungs spanning a pair of vertical power rails. A typical ladder logic statement may indicate that a specific output variable is "on" if and only if a first and a second input is "on". The ladder logic program not only manipulates single-bit input and output data representing the state of the sensing and operating devices, but also performs arithmetic operations, timing and counting functions and more complex processing operations.

A ladder program can be created by connecting a special input module to a PLC that includes a small keyboard and entering ladder logic statements directly into the memory of the PLC. Another method of creating a ladder logic program involves, utilizing a ladder logic program development/editor tool residing on a separate device, such as a personal computer. An operator or programmer of the personal computer draws a series of ladder logic graphs representing each rung or instruction directly on the computer display screen. Once the ladder logic program is complete, the PC software converts the graphs into the corresponding ladder logic commands. The ladder logic command are then transferred to the PLC and stored in the PLC memory.

A PLC and/or a personal computer device can store one or more ladder logic programs and versions. However, differences in these programs and versions are not easily discernible. For example, a vendor may receive an updated version of a ladder logic program that does not operate correctly with their system. The vendor may want to edit the program to eliminate the problem caused by the change, while still retaining other portions of the program that may be beneficial to the operation of the system. Therefore, if the vendor new the differences between the two ladder logic programs, the appropriate modifications can be incorporated. The only available system at this time has been a DOS based compare system that provides a printed text version of a difference file between the two ladder logic programs to a printer. The difference file is very difficult to interpret and many times fails to provide information relevant to differences in the rungs changed in the ladder logic programs. Accordingly there is an unmet need in the art to provide an improved system and method for comparing differences between two ladder logic programs.

SUMMARY OF THE INVENTION

The present invention provides for a system and method for displaying two different industrial control module programs in a single view (e.g., side-by-side view). The graphical compare utility provides a graphical view of a first industrial control module program in a first pane (e.g., left or top pane) and a graphical view of an industrial control module program in a second pane (e.g., right or bottom pane) within a single frame window. The graphical compare utility can also provide indicators of insertions, deletions, moves and modifications of instructions between the first and second ladder logic programs within the graphical views. A wrapping feature can also be provided to facilitate viewing of the instructions within the viewable frame during resizing and zooming of the single frame window.

In one aspect of the invention, a graphical compare utility is provided with a conversion system for converting two ladder logic programs into binary rung data sets. The binary rung data sets are transmitted to a difference component, which determines the difference between the binary rung data sets and provides a set of data structures representing the differences. A comparison component then generates a set of difference scenarios to a decision model, which select the optimal data set based on maximizing rung matchups. The optimal data set is then transmitted to a viewing component, which maps the data sets with graphics components associated with the operating system from which the utility model operates. The graphics components then provide the data sets to a display for providing a view of the first and the second ladder logic program with indicators for insertions, deletions, modifications and moves of rungs between the two ladder logic programs.

The following description and the annexed drawings set forth in detail certain illustrative aspects of the invention. These aspects are indicative, however, of but a few of the various ways in which the principles of the invention may be employed. Other advantages and novel features of the invention will become apparent from the following detailed description of the invention when considered in conjunction with the drawings.

DETAILED DESCRIPTION OF THE INVENTION

The present invention will now be described with reference to the drawings. The present invention will be described with reference to a system and method for providing a graphical compare utility. The graphical compare utility will provide a graphical view of two industrial controller control programs in a single view. The graphical compare utility provides a graphical view of a first industrial controller control program in a first pane and a graphical view of a second industrial controller control program in a second pane within a single frame window. For example, the two control programs can be provided in separate panes in an adjacent relationship (e.g., side-by-side view, top and bottom view) in a single frame window. The graphical compare utility can also provide indicators of insertions, deletions, moves and modifications of instructions between the first and second control programs within the graphical view. A wrapping feature can also be provided to facilitate viewing of the instructions within the viewable frame during resizing and zooming of the single frame window. The present system and method may be implemented utilizing hardware, software or a combination of both hardware and software.

The present examples will be illustrated with respect to a first and a second ladder logic program in a side-by-side configuration. However, it is to be appreciated that the present invention is applicable to other types of industrial controller control programs that can be represented graphically on a computer display or the like. Furthermore, the control programs can be displayed in a variety of configurations within different panes in a single window frame, such as top-to-bottom, side-by-side and diagonally. Additionally, the control programs can be displayed in a single frame window or pane and still fall within the scope of the present invention, so long as portions of the first and second control programs are viewable within a single view.

Figure 1:
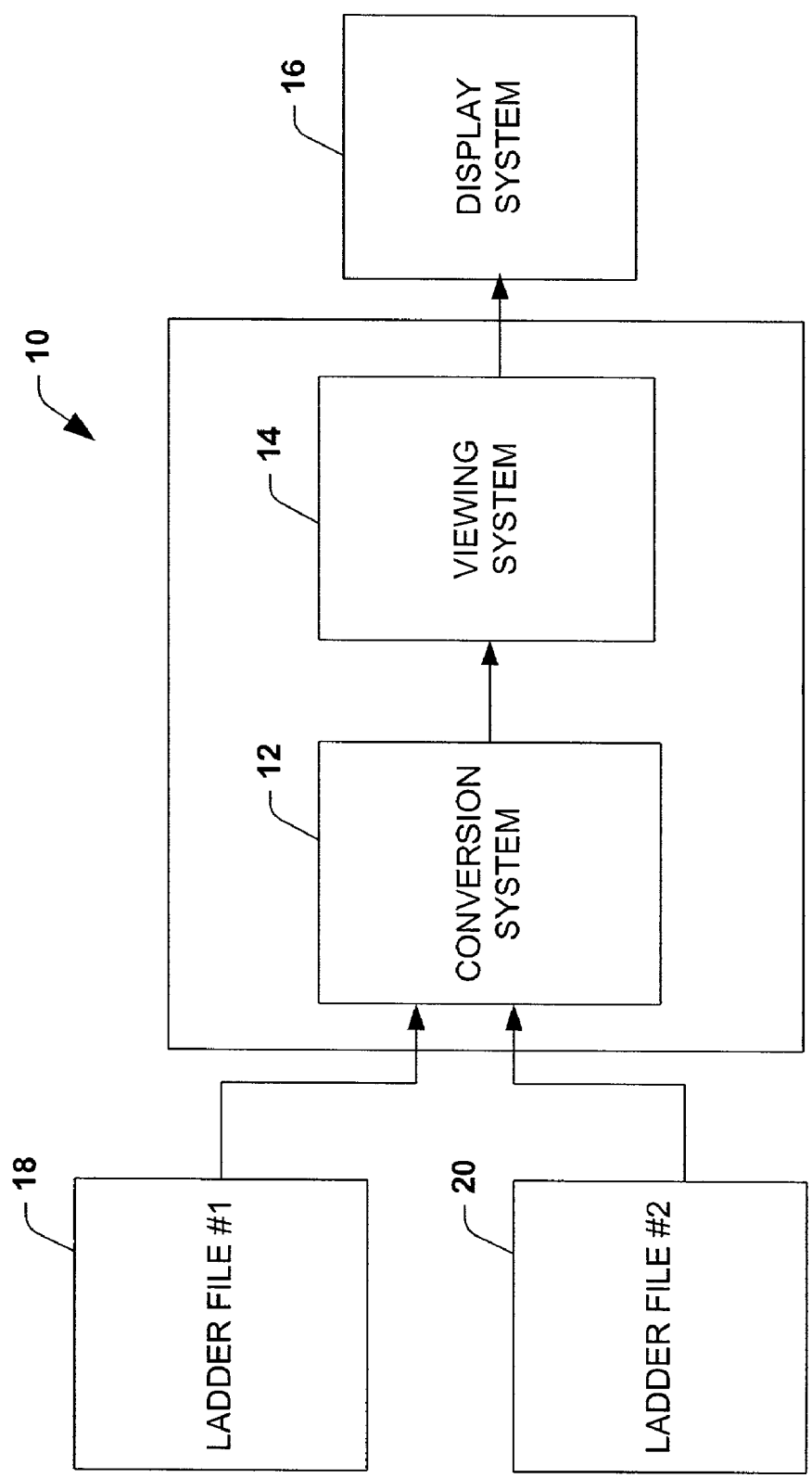
FIG. 1 is a block schematic diagram of a graphical compare utility system in accordance with one aspect of the present invention.

FIG. 1 illustrates a graphical compare utility system 10 for displaying two ladder logic programs graphically in a single frame window, so that an operator or the like can compare differences associated with the two ladder logic programs. The system 10 retrieves or receives a first ladder program or file 18 and a second ladder program or file 20. The first and second ladder files can reside in a project directory of a development machine, or can reside in the memory of one or more programmable logic computers (PLCs). The first and second ladder logic files can be accessed directly through the machine or through a communication line connections, such as a serial port or over a network (e.g., intranet, Internet). The first ladder file 18 and the second ladder file 20 are converted to independent data sets by a conversion system 12. The data sets, for example, can be comprised of discrete sets of component data representing each individual rung of the first and the second ladder file. After the data is converted into individual data sets, the data sets are transmitted to a viewing system 14. The viewing system invokes a frame window that displays a graphic representation of the first ladder logic program in a first pane and a graphic representation of the second ladder logic program in a second pane, such the graphic representations of the first and second ladder logic program are displayed in a single graphical view.

The viewing system 14 maps the individual data sets to graphics components associated with the operating system (e.g., APIs) of the machine or computer running the graphical compare utility system 10. For example, classes (C++, JAVA, C#) associated with the viewing system 14 receive the data sets. The classes associated with the viewing system 14 can include one or more data members and one or more methods associated with each of the classes. The classes associated with the application program can invoke or inherit classes from a framework (e.g., MFC) to communicate indirectly with the operating system or employ interfaces (e.g., COM components) to interface indirectly with the operating system, such that a windows based graphics program can be provided to display two ladder logic programs graphically in an adjacent relationship. The two ladder logic programs can then be displayed on a display system 16, such as a CRT or the like.

Figure 2:
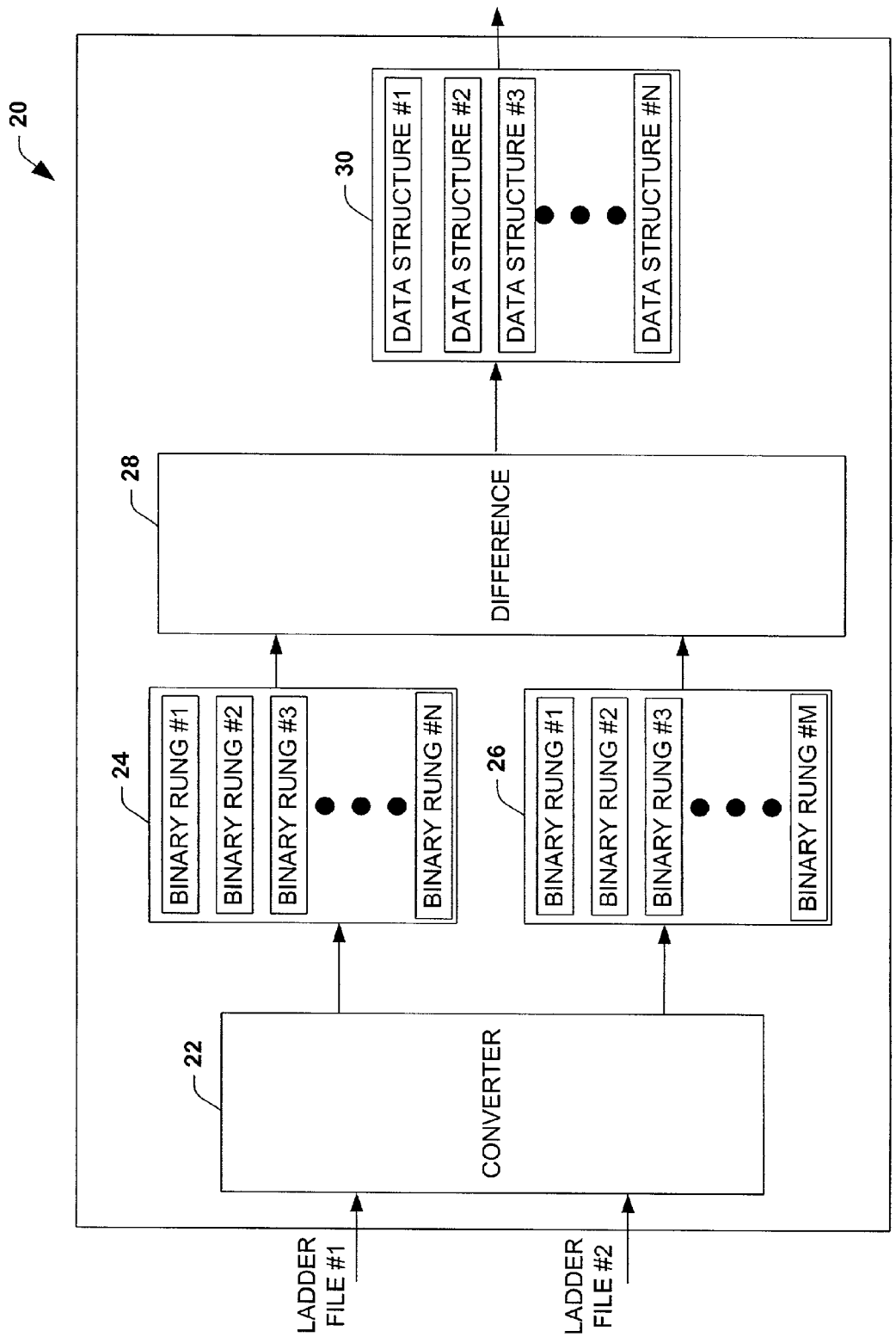
FIG. 2 is a block schematic diagram of a conversion system in accordance with one aspect of the present invention.
Figure 3:
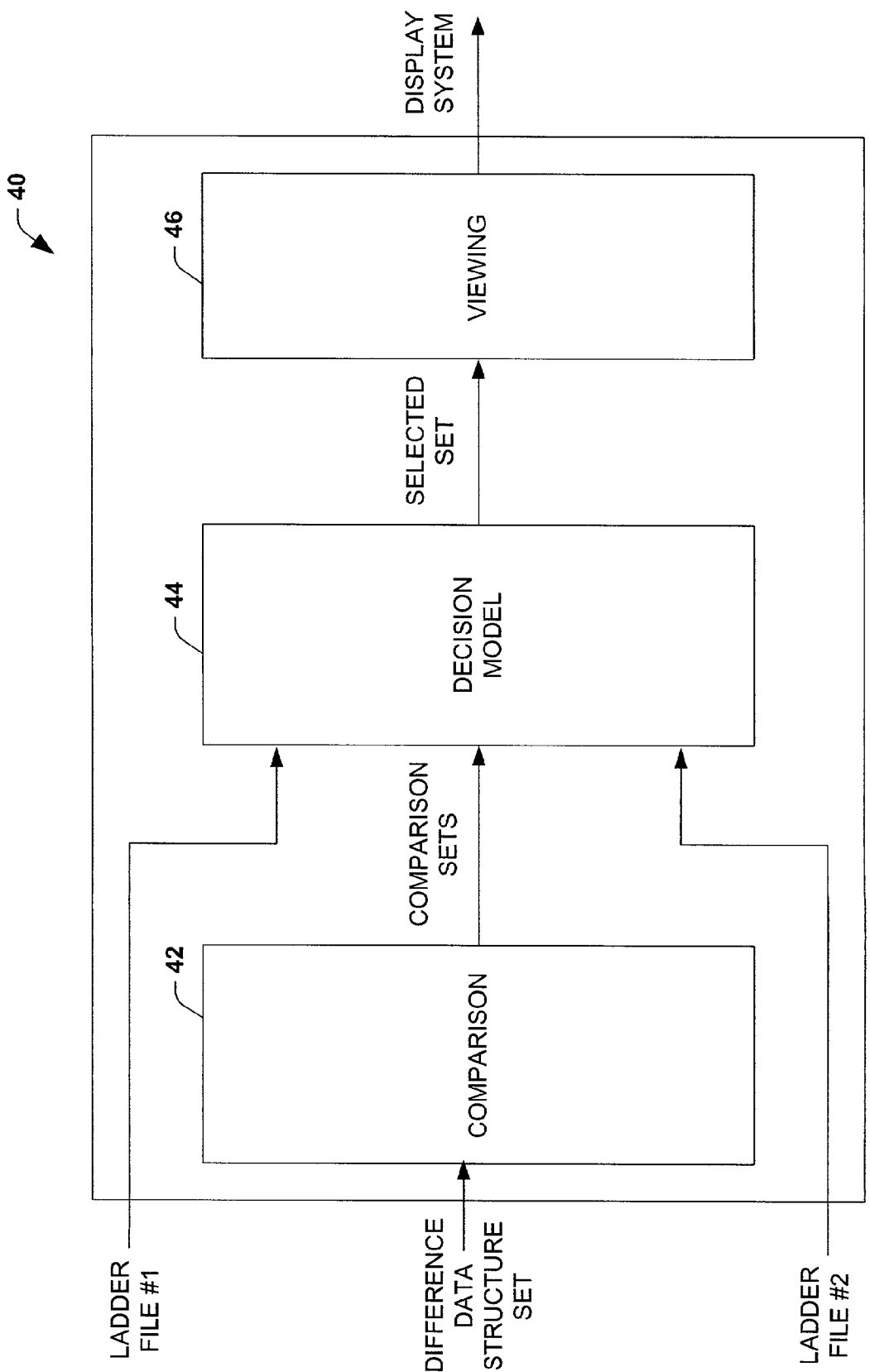
FIG. 3 is a block schematic diagram of a viewing system in accordance with one aspect of the present invention.

In one aspect of the invention, the system provides indicators representing differences in the first and second ladder programs, such that deletions, insertions, modifications and moved rungs can be indicated within a frame window of the display 16. FIGS. 2–3 illustrate an example of a possible conversion system and a possible viewing system for generating indicators within the displayed control programs via a display system.

FIG. 2 illustrates an example of a possible conversion system 20 for converting ladder logic files into a plurality of data sets representing differences between a first and a second ladder file. A first and a second ladder file are received by a converter 22, which converts the first ladder logic file into a set of individual binary rung components 24 (binary rungs 1–N) and the second ladder logic file into a set of individual binary rung components 26 (binary rungs 1–M). The first set of binary rung components 24 and the second set of binary rung components 26 are provided to a difference module 28. The difference module 28 compares the rungs of the first set of binary rung components 24 with the second set of binary rung components 26 and generates a set of data structures 30 representing the differences or changes between the first and second ladder file. The data structures 30 represent, for example, inserted rungs, deleted rungs, modified rungs and moved rungs. The data structures 30 can then be provided to the viewing system for determining the best display sets for the first and the second ladder files based on the differences represented by the data structures 30.

It is to be appreciated that although the converter 22 is illustrated with respect to a single component, the converter can be comprised of a first converter for converting the first ladder file to the first set of binary data rungs and a second converter for converting the second ladder file to the second set of binary data rungs. It is also to be appreciated that although the converter and the difference module are illustrated as separate components, the converter and the difference module can be integrated into a single system.

FIG. 3 illustrates an example of a viewing system 40 that utilizes the difference data structure set 30 representing differences or changes between the first and the second ladder logic file. The viewing system 40 then outputs graphical representations of the ladder logic programs in an adjacent relationship with indicators for insertions, deletions modifications and movements of rungs. The viewing system 40 includes a comparison component 42 that retrieves or receives the first and the second ladder file and the difference data structure set 30 representing differences between the two ladder files. The comparison component 42 runs through a set of scenarios to provide several comparison set views to a decision model 44, which selects the optimal comparison set view for displaying. The comparison and selection can be performed by applying an offset to one of a ladder comparison sets and determining how many rungs matchup with the other of the ladder comparison sets. Another offset can be applied and the scenario repeated a select number of times. The decision model 44 can then select the optimalset based on maximizing rung matchups.

It is to be appreciated that the decision model 44 can apply various other schemes to carry out the present invention, such as probabilistic models, expert systems and neural networks. It is to be also appreciated that the decision model can employ historical data to decide on the optimal display set. The selected set is then transmitted to the viewing component 46, which maps the selected set with graphics components such as APIs or the like associated with the operation system from which the application program or graphical compare utility system is operating. The viewing component 46 along with the graphical components of the operating system then provide two graphical adjacent ladder logic file or program views with indicators for rung insertions, deletions, modifications and moves in a single graphical view.

Figure 4:
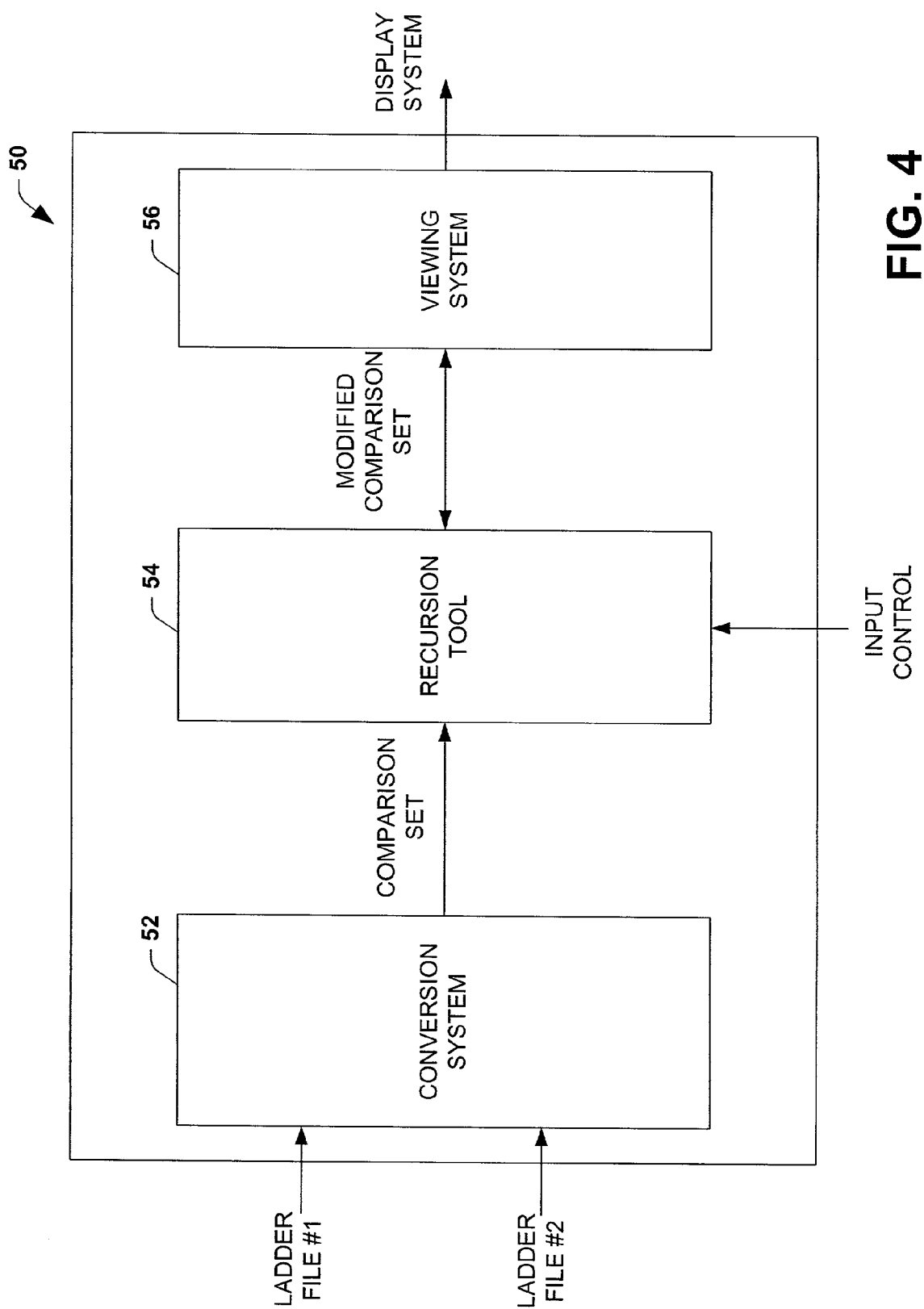
FIG. 4 is a block schematic diagram of a graphical compare utility system employing a recursion tool in accordance with one aspect of the present invention.

In one aspect of the invention, a recursion tool is provided for eliminating the problems associated with rungs extending outside a viewable space as windows are resized and/or rung sizes exceed the viewable area provided within a graphical frame window. FIG. 4 illustrates a system 50 for displaying two ladder logic programs graphically in an adjacent relationship, which provides rung wrapping functionality to one or both of the graphical ladder logic views (e.g., panes) in a frame window. The system 50 retrieves or receives a first ladder file and a second ladder file. The first ladder file and the second ladder file are converted to independent data sets by a conversion system 52. The data sets for example can be comprised of discrete sets of component data representing each individual rung of the first and the second ladder file. After the data is converted into individual data sets, the data sets are transmitted to the recursion tool 54.

The recursion tool 54 is a recursive algorithm that calculates the best way to maximize viewable space within each pane of the frame window and squeezes the rungs horizontally for each graphical ladder logic views within its corresponding pane on the screen, so that a user does not have to scroll to the right to view an entire rung within the panes. The recursion tool 54 allows for a minimum pane window width that will allow at least one instruction to reside horizontally across a row. If the rung does not fit within a single row, the rung will be wrapped to the next row so that none of the rungs are clipped. The recursion tool 54 allows for providing adjacent views of two graphical ladder logic programs within two adjacent panes within a frame window without the need to scroll to the right to view portions of the rung outside the viewable space of the pane. Furthermore, the recursion tool 54 provides for a printout of the adjacent views of two graphical ladder logic programs where none of the rungs are clipped. The recursion tool 54 can be enable/disabled by an input control though a windows menu or toolbar.

The recursion tool 54 is coupled to the viewing system 56, which maps the individual data sets to graphics components associated with the operating system (e.g., APIs). The graphic components of the operating system provide window display and control to the viewable program, such as menus, toolbars, window resizing, zooming and other graphical features associated with windows based programs. The recursion tool 54 is coupled to the zooming feature and frame or pane window real estate, such that rungs are dynamically squeezed and the rungs position (e.g., within a row, within one or more rows) dynamically recalculated when borders are resized and/or the zoom factor is invoked. The recursion tool 54 can be turned on and off by a user through a windows based selection menu or the like.

As illustrated in FIG. 4, the recursion tool 54 can be a separate component with respect to the viewing system 54 and a conversion system 52 that provides an adjacent graphical view of two ladder logic programs. It is to be appreciated that the recursion tool 54 can be incorporated into a system that provides indicators associated with insertions, deletions, modifications and moves of rungs as illustrated in FIGS. 2 and 3.

Figure 5:
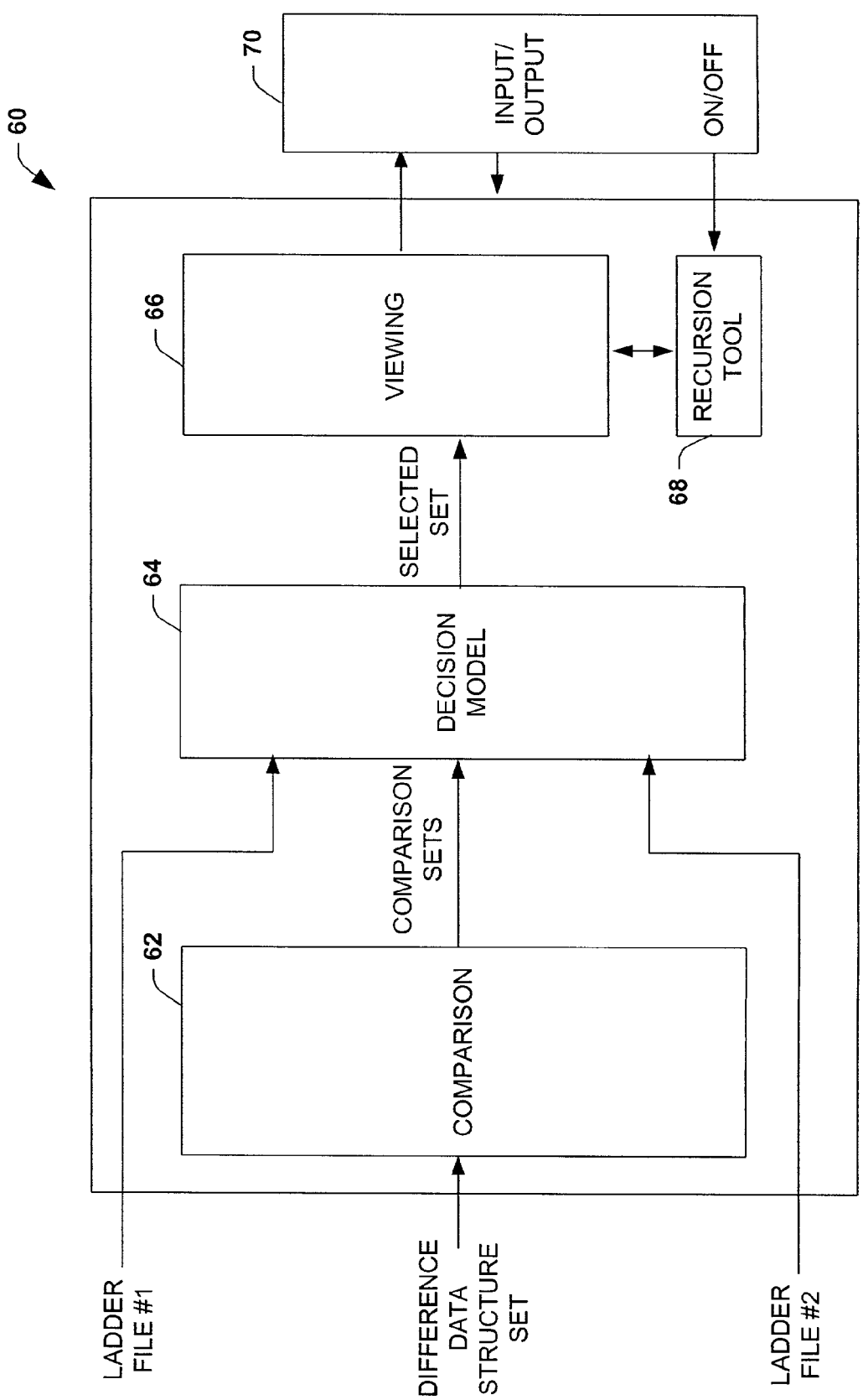
FIG. 5 is a block schematic diagram of a viewing system employing a recursion tool in accordance with one aspect of the present invention.

FIG. 5 illustrates a viewing system 60 incorporating both a decision model 64 and a recursion tool 68, such that rung wrapping can be incorporated into a graphical compare utility system that also provides indicators of insertions, deletions, modifications and moves of rungs. The viewing system 60 includes a comparison component 62 that retrieves or receives a first and a second ladder file and a difference data structure set representing differences between the two files. The comparison component 62 runs through a set of scenarios to provide several comparison set views to the decision model 64, which selects the optimal comparison set view for displaying. The comparison and selection can be performed by maximizing the rung matchups between the first and second ladder file and transmitting the selected set to a viewing component 66.

The viewing component 66 maps the selected set with graphics components associated with the operation system from which the application program is operating. The viewing component 66 and the graphics components provide two graphical ladder logic control program views with indicators of rung insertions, deletions, modifications and moves between the two ladder logic files. The graphical ladder logic control program views are then sent to an input/output system 70, which can display and/or printout the graphical views of the two ladder logic files. A recursion tool 68 is coupled to the viewing components and provides rung wrapping capabilities to the panes in the frame window of the graphical view. The recursion tool 68 is a recursive algorithm that calculates the best way to maximize viewable space within each of the panes in the frame window and squeezes the rungs horizontally for both graphical ladder logic views on the screen, so that a user does not have to scroll to the right to view an entire rung. The recursion tool 68 is similar in functionality to the recursion tool 54 illustrated in FIG. 4 and is coupled to the window resizing and zooming features associated with the compare utility. The recursion tool 68 can be turned on and off by the input/output component 70.

Figure 6:
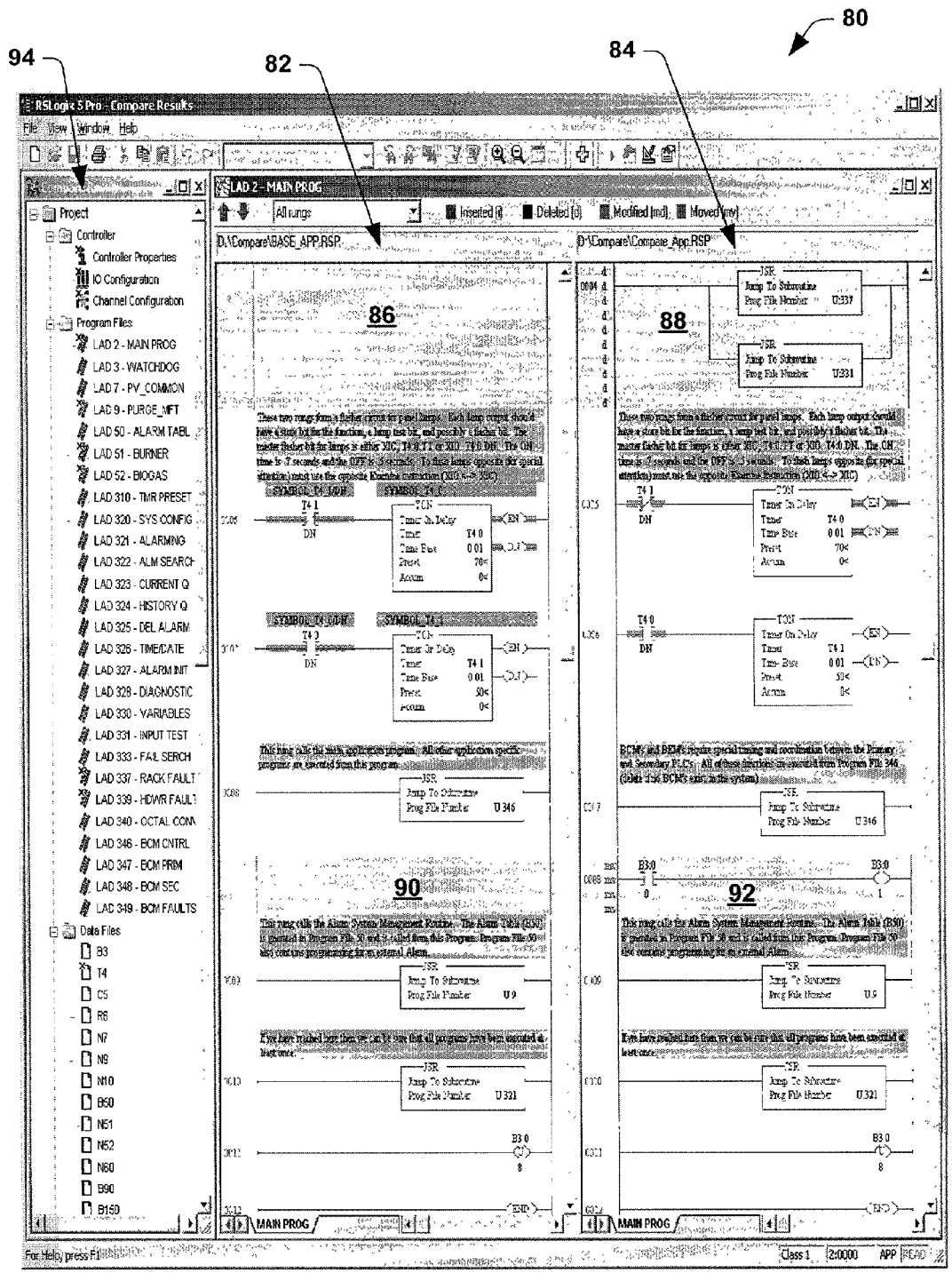
FIG. 6 is a graphical frame window with control programs viewable in a first and second pane illustrating indicators for deleted and moved rungs in accordance with one aspect of the present invention.

FIGS. 6–9 illustrate certain functional features of the graphical compare utility with respect to views associated with comparing two side-by-side graphical ladder logic views in accordance with certain aspects of the present invention. FIG. 6 illustrates a typical compare result of two ladder logic files displayed graphically in a side-by-side relationship or configuration. The graphical compare utility loads two ladder logic projects from a project folder 94 selected by a user. It is to be appreciated that the two ladder logic projects can be loaded from a variety of locations, such as remotely from one or more PLCs and/or computers. These two projects are then compared by the graphical compare utility and the results of that compare are displayed to the user in a frame window 80 in two side-by-side window panes 82 and 84. BASE_APP.RSP is illustrated in the left pane 82, while COMPARE_APP.RSP is illustrated in the right hand pane 84. Matching rungs are aligned in each pane view and will scroll together as the scroll bars are moved. As seen in FIG. 6, a rung that was deleted in the left hand pane 82 shows up as a blank space 86, while the same rung 88 is highlighted (e.g., in red) in the right hand pane 84. Also illustrated in FIG. 6, in the right window pane 84 is a rung 92 that was moved (e.g., in gray highlight) illustrated as a blank space 90 in the left pane 82. The compare utility found an equivalent rung in the BASE_APP.RSP project somewhere else in the ladder but not within the viewable space.

Figure 7:
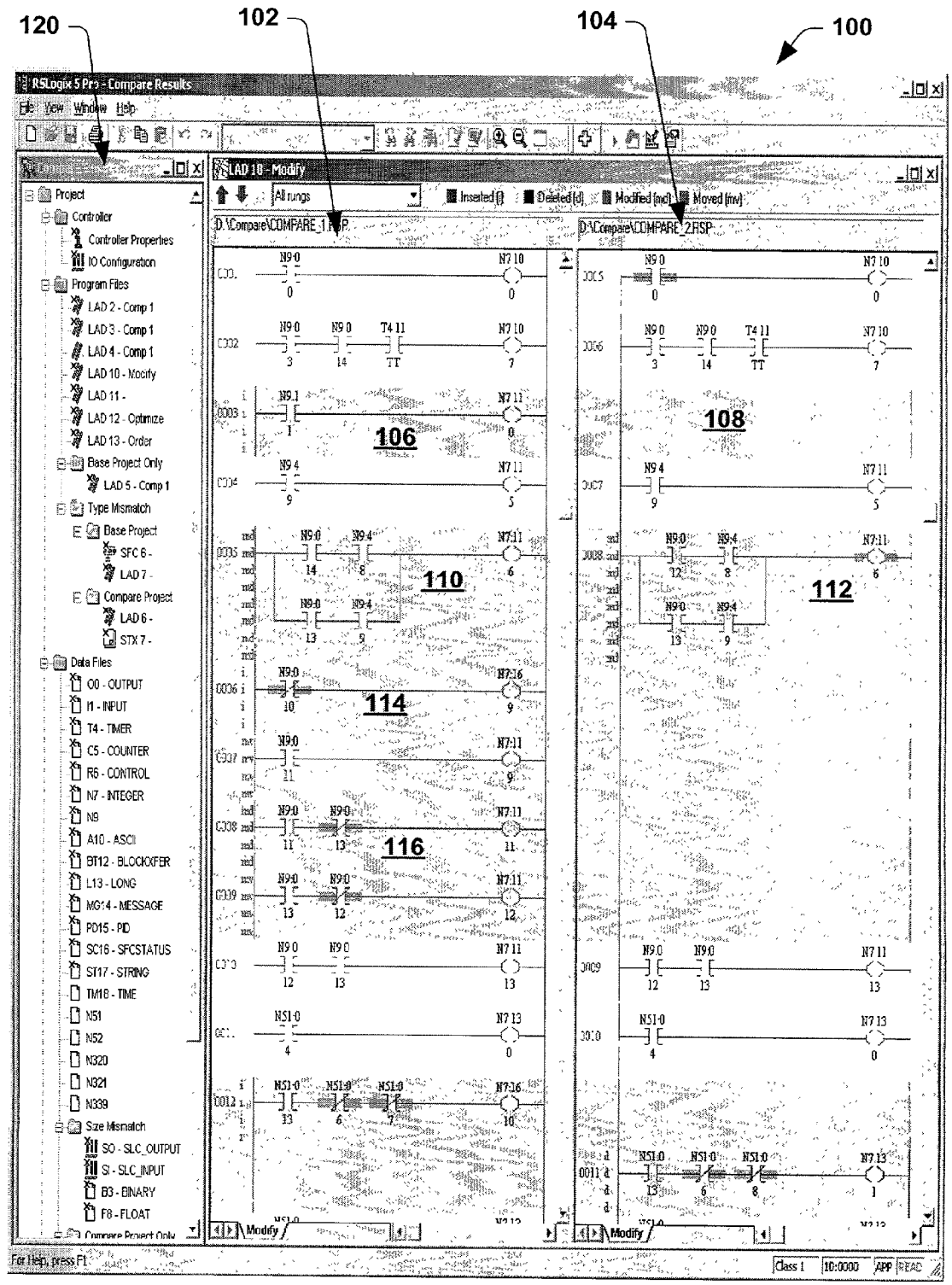
FIG. 7 is a graphical frame window with control programs viewable in a first and second pane illustrating indicators for inserted, modified and moved rungs in accordance with one aspect of the present invention.

FIG. 7 illustrates another example of a view within a frame 100 provided by the graphical compare utility that shows inserted, moved and modified rungs. The graphical compare utility loads two ladder logic projects from a project folder 120 selected by a user. These two projects are then compared by the graphical compare utility and the results of that compare are displayed to the user in a frame window 100 in two side-by-side window panes 102 and 104. COMPARE_1.RSP is illustrated in the left pane 102, while COMPARE_2.RSP is illustrated in the right hand pane 104. In this example, rung number 0003 was found in the COMPARE_1.RSP project (left pane) but was not found in the COMPARE_2.RSP project (right pane). This is illustrated as an inserted rung 106 in the left pane 102 shown highlighted (e.g., marked in green) and a blank space 108 in the right hand pane 104. Rungs 0006 and 0012 in COMPARE_1.RSP are also marked as inserted as indicated by reference number 114 and 116 in the left hand pane 102.

A modified rung is found when the two rungs are closely matched but not exactly. "Closely" means the last instruction in the ladder, the output instruction, is the same but the logic in front of it has been changed in some way. This is illustrated in rung number 0005 in COMPARE_1.RSP and rung number 0008 in COMPARE_2.RSP, indicated as reference numerals 110 and 112, respectively. Since both rungs 110 and 112 control the same output N7:11/6, both are considered to be matched but since the driving logic is different, the graphical compare utility marks them as modified. Another scenario is a rung that was found to be modified and moved. This is illustrated with rung number 0008 in COMPARE_.RSP indicated at reference numeral 116. Rung 116 is marked as modified in the view but has no matching rung in the opposing pane. However, the rung 116 was moved, its matching rung is marked as modified elsewhere in the other project outside the view.

Figure 8:
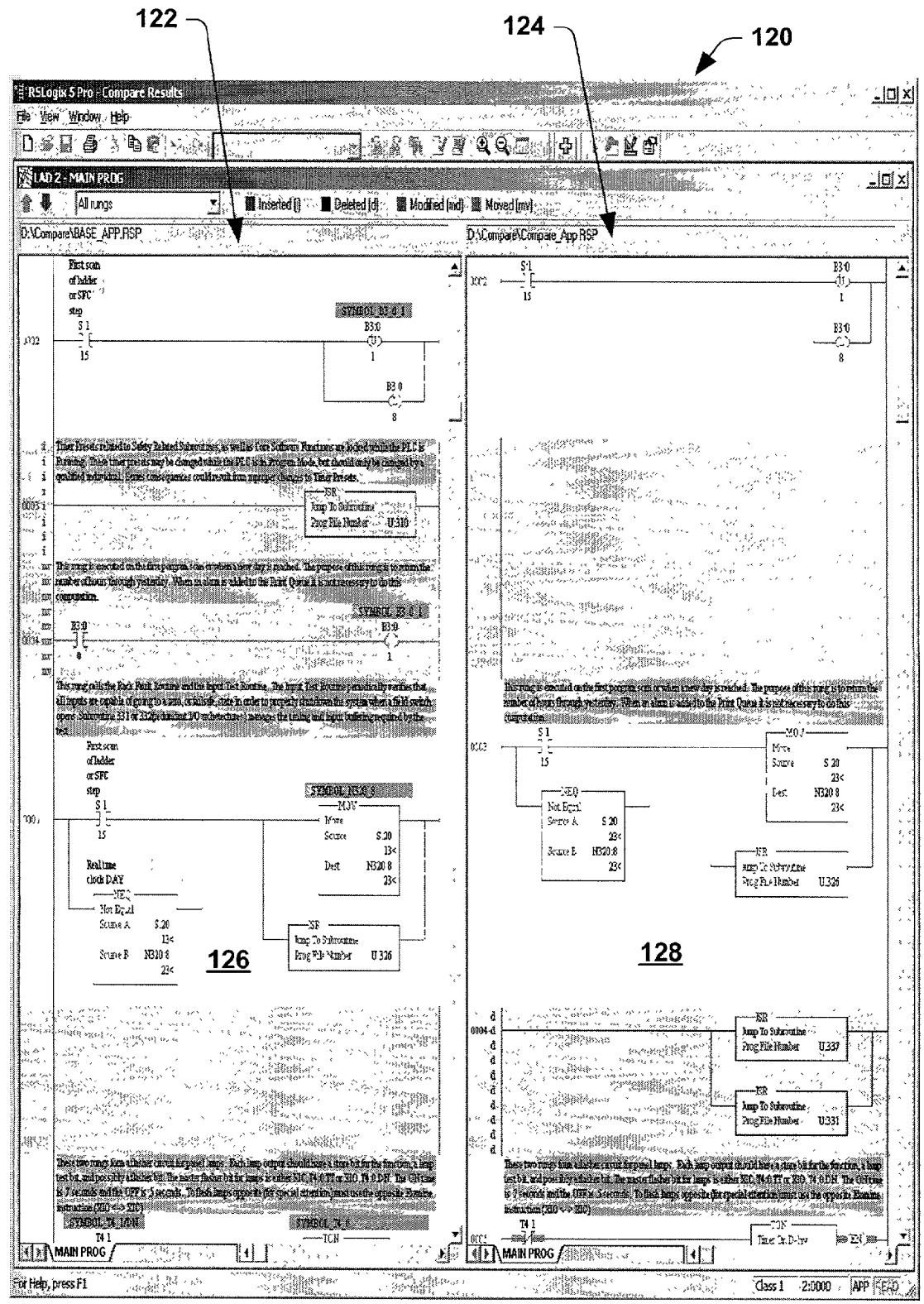
FIG. 8 is a graphical frame window with control programs viewable in a first and second pane with rung wrap capabilities disabled in accordance with one aspect of the present invention.
Figure 9:
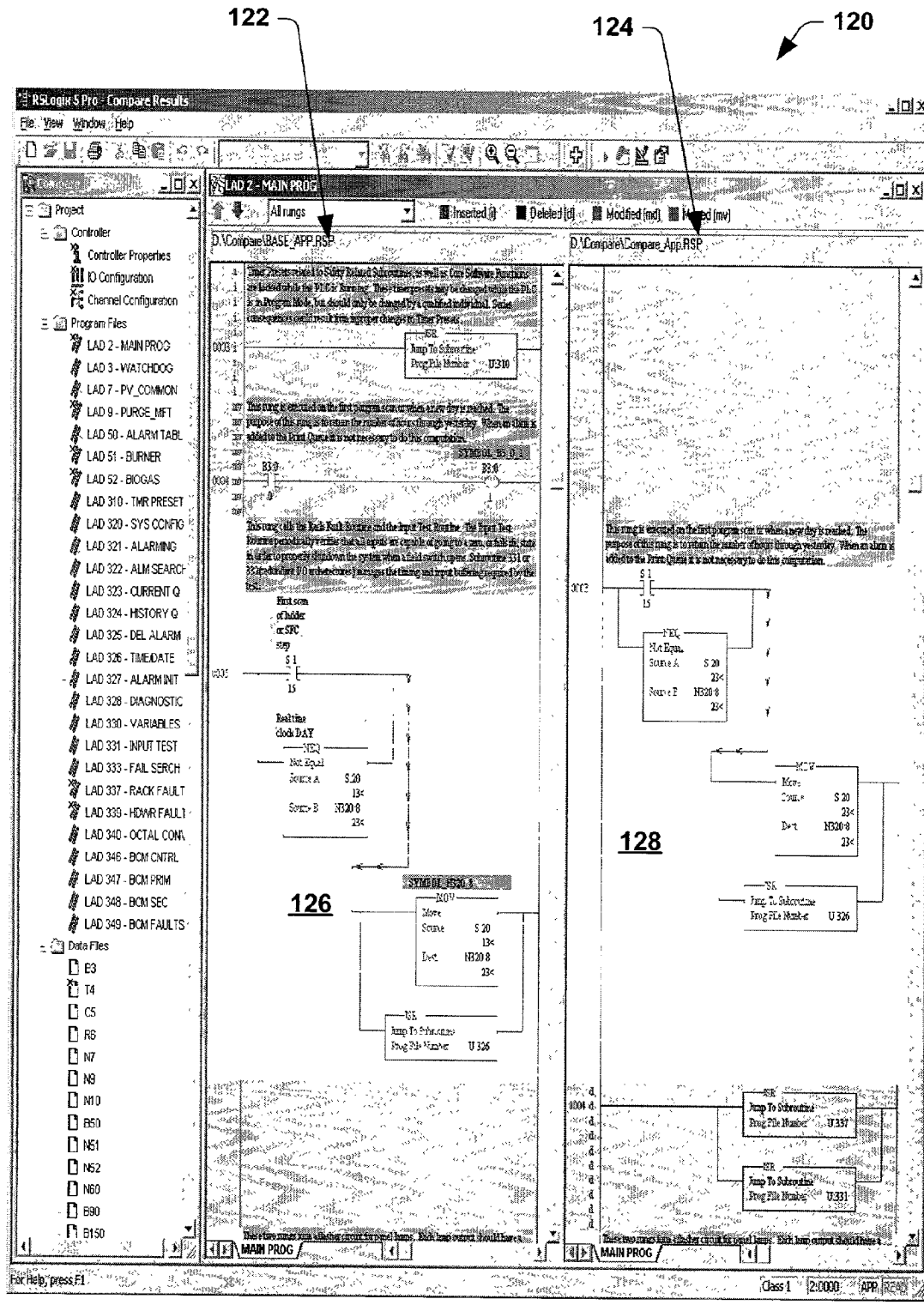
FIG. 9 is a graphical frame window with control programs viewable in a first and second pane with rung wrap capabilities enabled in accordance with one aspect of the present invention.

FIGS. 8–9 illustrate disablement/enablement of rung wrapping functionality of the graphical compare utility in accordance with certain aspects of the present invention. FIG. 8 illustrates a typical compare result of two ladder logic files displayed graphically in a frame window 120 in a side-by-side relationship. BASE_APP.RSP is illustrated in the left pane 122, while COMPARE_APP.RSP is illustrated in the right hand pane 124. Matching rungs are aligned in each pane view and will scroll together as the scroll bars are moved. As seen in FIG. 8, each rung extends straight across the pane from left to right. If the view were sized down horizontally, some of the rungs would no longer fit in the view and scroll off the page or be clipped. For example, rung 126 in the left pane 122 and rung 128 in the right hand pane 124 are both clipped from the viewing space within the corresponding panes. This is particularly a problem with the compare utility because the user is viewing two ladders side-by-side, severely limiting the screen space available for each ladder view. FIG. 9 illustrates the same ladder views with rung wrapping functionality enabled. Notice that rung 126 in the left pane 122 and rung 128 in the right pane have adjusted themselves so that they fit within the space given. This allows the whole rung to be viewed without scrolling vertically. Also notice that the rungs continue to stay in sync with each other in the view even though their relative sizes have changed.

Figure 10:
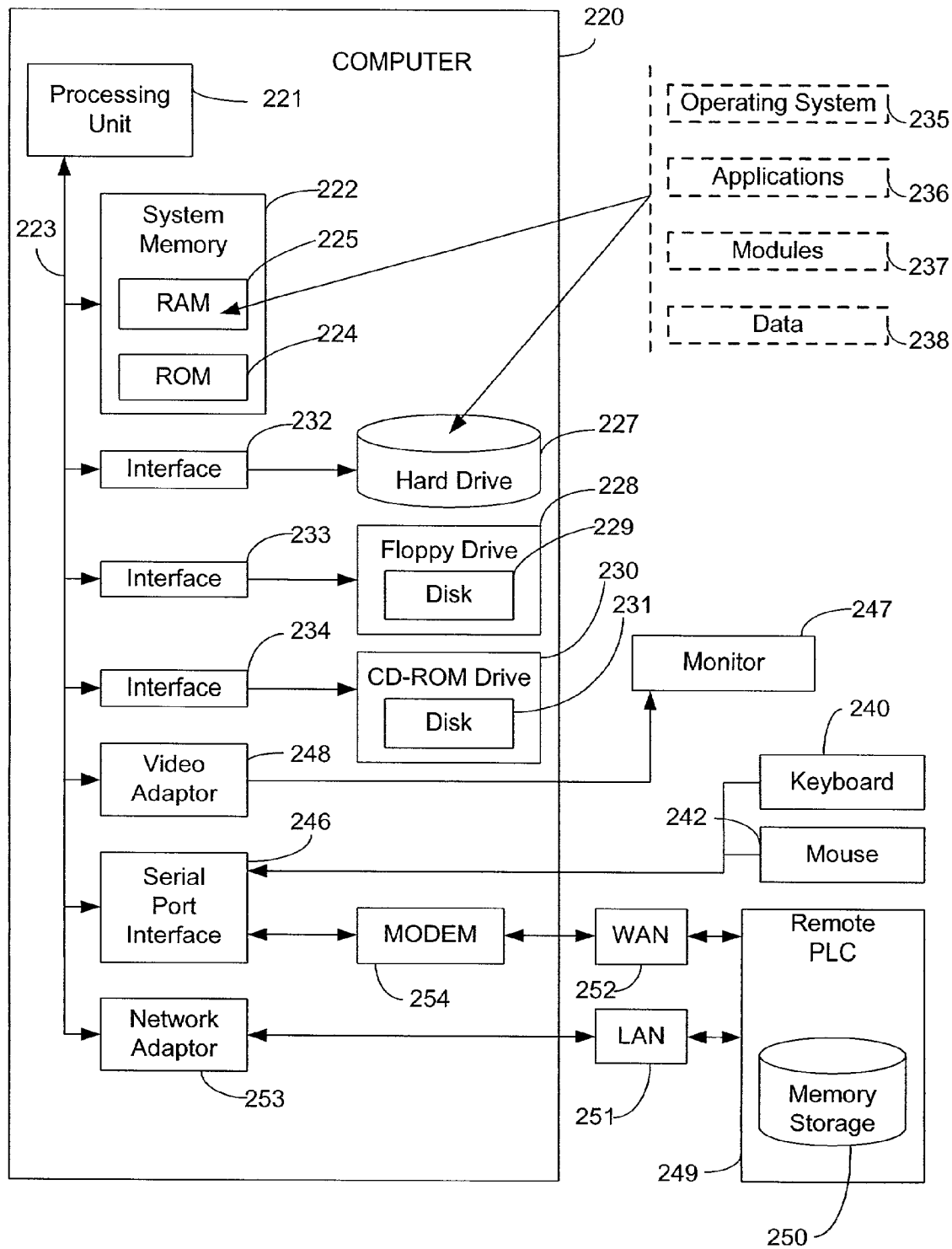
FIG. 10 illustrates a block diagram of a computer system in accordance with an environment of the present invention.

With reference to FIG. 10, an exemplary system for implementing the invention includes a conventional personal or server computer 220, including a processing unit 221, a system memory 222, and a system bus 223 that couples various system components including the system memory to the processing unit 221. The processing unit may be any of various commercially available processors, including Intel x86, Pentium and compatible microprocessors from Intel and others, including Cyrix, AMD and Nexgen; Alpha from Digital; MIPS from MIPS Technology, NEC, IDT, Siemens, and others; and the PowerPC from IBM and Motorola. Dual microprocessors and other multi-processor architectures also can be used as the processing unit 221.

The system bus may be any of several types of bus structure including a memory bus or memory controller, a peripheral bus, and a local bus using any of a variety of conventional bus architectures such as PCI, VESA, Microchannel, ISA and EISA, to name a few. The system memory includes read only memory (ROM) 224 and random access memory (RAM) 225. A basic input/output system (BIOS), containing the basic routines that help to transfer information between elements within the computer 220, such as during start-up, is stored in ROM 224.

The computer 220 further includes a hard disk drive 227, a magnetic disk drive 228, e.g., to read from or write to a removable disk 229, and an optical disk drive 230, e.g., for reading a CD-ROM disk 231 or to read from or write to other optical media. The hard disk drive 227, magnetic disk drive 228, and optical disk drive 230 are connected to the system bus 223 by a hard disk drive interface 232, a magnetic disk drive interface 233, and an optical drive interface 234, respectively. The drives and their associated computer-readable media provide nonvolatile storage of data, data structures, computer-executable instructions, etc. for the server computer 220. Although the description of computer-readable media above refers to a hard disk, a removable magnetic disk and a CD, it should be appreciated by those skilled in the art that other types of media which are readable by a computer, such as magnetic cassettes, flash memory cards, digital video disks, Bernoulli cartridges, and the like, may also be used in the exemplary operating environment.

A number of program modules may be stored in the drives and RAM 225, including an operating system 235, one or more application programs 236, other program modules 237, and program data 238. A user may enter commands and information into the computer 220 through a keyboard 240 and pointing device, such as a mouse 242. Other input devices (not shown) may include a microphone, joystick, game pad, satellite dish, scanner, or the like. These and other input devices are often connected to the processing unit 221 through a serial port interface 246 that is coupled to the system bus, but may be connected by other interfaces, such as a parallel port, game port or a universal serial bus (USB). A monitor 247 or other type of display device is also connected to the system bus 223 via an interface, such as a video adapter 248. In addition to the monitor, computers typically include other peripheral output devices (not shown), such as speakers and printers.

The computer 220 may operate in a networked environment using logical connections to one or more remote PLCs, such as a remote PLC 249. Alternatively, the remove PLC 249 may be coupled to a workstation, a server computer, a router, a peer device or other common network node remote device. This remote device can include many or all of the elements described relative to the computer 220, although only a memory storage device 250 has been illustrated in FIG. 10. The logical connections depicted in FIG. 10 include a local area network (LAN) 251 and a wide area network (WAN) 252. Such networking environments are commonplace in offices, enterprise-wide computer networks, intranets and the Internet.

When used in a LAN networking environment, the computer 220 is connected to the local network 251 through a network interface or adapter 253. When used in a WAN networking environment, the server computer 220 typically includes a modem 254, or is connected to a communications server on the LAN, or has other means for establishing communications over the wide area network 252, such as the Internet. The modem 254, which may be internal or external, is connected to the system bus 223 via the serial port interface 246. In a networked environment, program modules depicted relative to the computer 220, or portions thereof, may be stored in the remote memory storage device. It will be appreciated that the network connections shown are exemplary and other means of establishing a communications link between the computers may be used.

In accordance with practices of persons skilled in the art of computer programming, the present invention is described below with reference to acts and symbolic representations of operations that are performed by the computer 220, unless indicated otherwise. Such acts and operations are sometimes referred to as being computer-executed. It will be appreciated that the acts and symbolically represented operations include the manipulation by the processing unit 221 of electrical signals representing data bits which causes a resulting transformation or reduction of the electrical signal representation, and the maintenance of data bits at memory locations in the memory system (including the system memory 222, hard drive 227, floppy disks 229, and CD-ROM 231) to thereby reconfigure or otherwise alter the computer system's operation, as well as other processing of signals. The memory locations where data bits are maintained are physical locations that have particular electrical, magnetic, or optical properties corresponding to the data bits.

Figure 11:
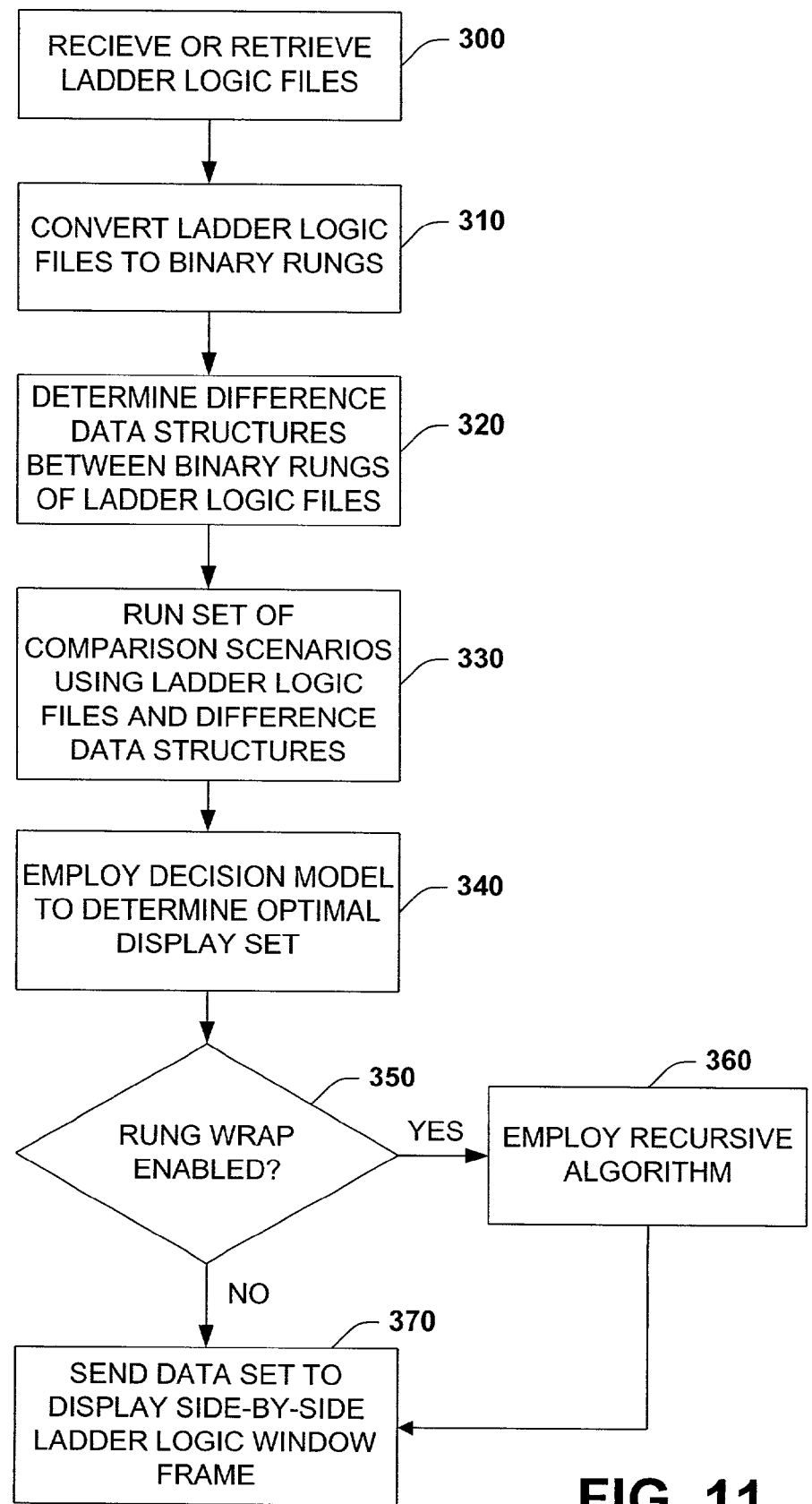
FIG. 11 illustrates a flow diagram of a methodology for implementing the graphical compare utility in accordance with one aspect of the present invention.

In view of the foregoing structural and functional features described above, a methodology in accordance with various aspects of the present invention will be better appreciated with reference to FIG. 11. While, for purposes of simplicity of explanation, the methodology of FIG. 11 is shown and described as executing serially, it is to be understood and appreciated that the present invention is not limited by the illustrated order, as some aspects could, in accordance with the present invention, occur in different orders and/or concurrently with other aspects from that shown and described herein. Moreover, not all illustrated features may be required to implement a methodology in accordance with an aspect the present invention. It is further to be appreciated that the following methodology may be implemented as computer-executable instructions, such as software stored in a computer-readable medium. Alternatively, the methodology may be implemented as hardware or a combination of hardware and software.

FIG. 11 illustrates one particular methodology for displaying two adjacent graphical ladder logic views in accordance with one particular aspect of the present invention. The methodology begins at 300 where the comparison utility receives or retrieves two ladder logic files. At 310, the compare utility converts the ladder logic files into two binary rung data sets for comparison with one another. At 320, the comparison utility determines differences between the two binary rung data sets and provides difference data structures representing insertions, deletions, modifications and moves of binary rungs between the two binary rung data sets. At 330, the compare utility runs a set of comparison scenarios using the two ladder logic files and the difference data structures. At 340, a decision model is employed to determine the optimal display set, for example, by determine a display set with the maximum number of matching rungs. The methodology then proceeds to 350. At 350, the comparison utility determines if rung wrap is enabled. If rung wrap is not enabled (NO), the method proceeds to 370. If the rung wrap is enabled (YES), the method proceeds to 360 and employs a recursive algorithm on the selected data set. The method then proceeds to 370. At 370, the compare utility sends the data set to display adjacent ladder logic views in a single window frame on a CRT or the like.

The present invention has been illustrated with respect to a programming methodology and/or computer architecture and a particular example, however, it is to be appreciated that various programming methodology and/or computer architecture suitable for carrying out the present invention may be employed and are intended to fall within the scope of the hereto appended claims.

The invention has been described with reference to various aspects of the present invention. Obviously, modifications and alterations will occur to others upon reading and understanding the foregone detailed description. It is intended that the invention be construed as including all such modifications alterations, and equivalents thereof.

What is claimed is:

1. A graphical compare utility system for displaying control programs for industrial control modules, the system comprising:
   a conversion system that receives a first and a second control program and converts the first and second control program into a first and second data set representing individual instruction of the first and second control program;
   a viewing system that accepts the first and second data sets and provides a graphical view of the first and second control programs in a single view based on the first and second binary data sets;
   a difference module that determines differences between the first and the second control programs and provides a difference data structure representing the differences between the first and second control program; and
   a comparison module that receives the difference data structure and the first and second control programs and generates a plurality of comparison scenarios to provide a plurality of comparison set views, the comparison module employing a decision model to determine the optimal display set view from the plurality of comparison set views by maximizing individual instruction matches between the first and second control programs.

2. The system of claim 1, the graphical utility system providing indicators for insertions, deletions, modifications and moves of individual instructions between the first and the second control program.

3. The system of claim 1, the individual instruction being rungs of first and second ladder logic programs.

4. The system of claim 1, the decision model transmitting the optimal display set view to a viewing component, the viewing component mapping the optimal display set view to graphic components associated with an operating system, such that the optimal display set view can be provided to a display system for providing a graphical representation of the first and second control program in a single view.

5. The system of claim 1, further comprising a recursion tool to provide wrapping of the graphical view of the first and second control program, such that instructions of the control programs are wrapped in corresponding panes of a single frame window to avoid clipping of the instructions.

6. The system of claim 5, the recursion tool being coupled to window resizing and zooming features of the graphical compare utility system, such that the graphical view of the first and second control programs is dynamically adjusted when at least one of window resizing and zooming is invoked.

7. The system of claim 5, the recursion tool having an enabled state and a disabled state.

8. The system of claim 5, the recursion tool provides a printout of the graphical view of all or a portion of the first and second control program.

9. A graphical utility system for displaying two control programs for industrial control modules in an adjacent configuration, the system comprising:
   a conversion system that receives a first and a second control program and converts the first and second control program into a first and second binary data set representing individual instruction of the first and second control program;
   a difference module for determining differences between the first and the second binary data set and providing a difference data structure representing the differences between the first and second control programs;
   a comparison module that receives the difference data structure and the first and second control programs and generates a plurality of comparison scenarios to provide a plurality of comparison set views;
   a decision model that determines an optimal display set view from the plurality of comparison set views by maximizing individual instruction matches between the first and second control programs; and
   a viewing system that accepts the optimal display set view and provides a graphical view of the first and second control programs in an adjacent configuration.

10. The system of claim 9, the graphical utility system providing indicators for insertions, deletions, modifications and moves of individual instructions between the first and the second control program.

11. The system of claim 9, further comprising a recursion tool to provide wrapping of the graphical view of the first and second control programs, such that instructions of the control programs are wrapped in corresponding panes of a single frame window to avoid clipping of the instructions.

12. The system of claim 11, the recursion tool being coupled to window resizing and zooming features of the graphical compare utility system, such that the graphical view of the first and second control programs are dynamically adjusted when at least one of window resizing and zooming is invoked.

13. The system of claim 11, the recursion tool having an enabled state and a disabled state.

14. The system of claim 11, the recursion tool being operable to provide a printout of two side-by-side graphical views of all or a portion of the first and second control program.

15. A method for displaying graphical representations of two ladder logic control programs for industrial controllers, the method comprising:
   retrieving a first ladder logic control program and a second ladder logic control program; and
   converting the first and second ladder logic control program into a first and second data set representing individual rungs of the first and second ladder logic control program;
   determining differences between the first and the second ladder logic control programs and providing a difference data structure representing the differences between the first and second ladder logic control program;
   generating a plurality of comparison scenarios based on the differences to provide a plurality of comparison set views and selecting an optimal display set view from the plurality of comparison set views by maximizing individual rung matches between the first and second ladder logic control programs; and
   providing the first and second data sets to a graphical viewing system, the graphical viewing system providing a graphical view of the first and the second ladder logic control programs in the single optimal display set view.

16. The method of claim 15, further comprising providing indicators for insertions, deletions, modifications and moves of individual rungs between the first and the second ladder logic control program, the indictors being provided in the graphical view.

17. The method of claim 15, further comprising transmitting the optimal display set view to a viewing component, the viewing component providing a graphical view of the first and second ladder logic control program in a single frame window.

18. The method of claim 15, further comprising subjecting the graphical view to a recursive algorithm, such that rungs of the ladder logic control program are wrapped in corresponding window panes of a single frame window to avoid clipping of the rungs.

19. The method of claim 18, further comprising dynamically adjusting the graphical view of the first and second ladder logic control programs in response to at least one of window resizing and window zooming.

20. A system for displaying graphical representations of two control programs for industrial control modules in an adjacent configuration, the system comprising:

means for receiving a first and a second control program and converting the first and second control program into a first and second binary data set representing individual instruction of the first and second control program;

means for determining differences between the first and the second binary data set and providing a difference data structure representing the differences between the first and second control programs;

means for receiving the difference data structure and the first and second control programs and generating a plurality of comparison scenarios to provide a plurality of comparison set views;

means for determining an optimal display set view from the plurality of comparison set views by maximizing individual instruction matches between the first and second control programs; and means for accepting the optimal display set view and providing a graphical view of the first and second control programs in an adjacent configuration.

21. The system of claim 20, further comprising means for wrapping instructions in the graphical view of the first and second control program.

* * * * *